(12) United States Patent
Rick (10) Patent No.: US 8,725,161 B2
(45) Date of Patent: May 13, 2014

(54) EXCESS DELAY ESTIMATION USING TOTAL RECEIVED POWER

(75) Inventor: Roland Reinhard Rick, Superior, CO (US)

(73) Assignee: QUALCOMM Incorporated, San Diego, CA (US)

(*) Notice: Subject to any disclaimer, the term of this patent is extended or adjusted under 35 U.S.C. 154(b) by 1194 days.

(21) Appl. No.: 11/569,396

(22) PCT Filed: Dec. 8, 2004

(86) PCT No.: PCT/US2004/041475
§ 371 (c)(1),
(2), (4) Date: Dec. 18, 2007

(87) PCT Pub. No.: WO2005/057946
PCT Pub. Date: Jun. 23, 2005

(65) Prior Publication Data
US 2008/0094277 A1 Apr. 24, 2008

Related U.S. Application Data

(60) Provisional application No. 60/527,990, filed on Dec. 8, 2003.

(51) Int. Cl.
*H04W 24/00* (2009.01)
*H04B 15/00* (2006.01)

(52) U.S. Cl.
USPC .................................... 455/456.1; 455/504

(58) Field of Classification Search
USPC ............... 455/456, 504, 456.1, 456.5, 456.6
See application file for complete search history.

(56) References Cited

U.S. PATENT DOCUMENTS 5,874,914 A * 2/1999 Krasner .................... 342/357.12
6,633,255 B2 10/2003 Krasner
(Continued)

FOREIGN PATENT DOCUMENTS

| KR | 20030055412 A | 7/2003 |
|----|---------------|--------|
| WO | WO0042445 A1 | 7/2000 |
| WO | WO0165271 A1 | 9/2001 |
| WO | WO03087869 | 10/2003 |

OTHER PUBLICATIONS

"Proposed Revision to Recommendation ITU-R p. 1411-1 Dependence of RMS Delay Spread on Shadowing", ITU document 3K/UK15-E, Mar. 22, 2002.*

(Continued)

*Primary Examiner* — Qun Shen
(74) *Attorney, Agent, or Firm* — Howard Seo (57) ABSTRACT

To determine the position of a mobile device located within a coverage area of a base station, the time of arrival (TOA) of the CDMA signal received by the mobile device from the base station is reduced in proportion to the received power of the CDMA signal. The mobile device uses the reduced TOA of the CDMA signals together with the received GPS signals to detect its position. Alternatively, the mobile device transmits the TOA and power measurements of the received CDMA signals to a position determination entity (PDE). The PDE biases the TOA to estimate the position of the mobile device and transmits assistance data to the mobile device, thereby enabling the mobile device to receive GPS signals. The received GPS signals alone, or in combination with the biased TOA are then used to recompute the position of the mobile device.

22 Claims, 7 Drawing Sheets

(56) References Cited

U.S. PATENT DOCUMENTS

| | | |
|---|---|---|
| 6,639,554 B2 | 10/2003 | Kim et al. |
| 6,658,258 B1 | 12/2003 | Chen et al. |
| 2002/0084933 A1* | 7/2002 | Krasner .................. 342/357.01 |
| 2002/0132625 A1* | 9/2002 | Ogino et al. .................. 455/456 |
| 2003/0008622 A1* | 1/2003 | Fernandez-Corbaton et al. .............................. 455/68 |
| 2003/0054832 A1* | 3/2003 | Stein ............................ 455/456 |
| 2003/0064733 A1* | 4/2003 | Okanoue et al. ............. 455/456 |
| 2003/0087604 A1* | 5/2003 | Stein et al. ...................... 455/65 |
| 2003/0222819 A1* | 12/2003 | Karr et al. .................... 342/457 |

OTHER PUBLICATIONS

International Search Report and Written Opinion—PCT/US2004/041475, International Search Authority—European Patent Office—Jul. 29, 2005.

European Search Report—EP04813741—Search Authority—Munich—May 6, 2011.

* cited by examiner

EXCESS DELAY ESTIMATION USING TOTAL RECEIVED POWER

CROSS-REFERENCES TO RELATED APPLICATIONS

This application is the National Stage of International Application No. PCT/US2004/041475, filed Dec. 8, 2004, which claims the benefit of U.S. Provisional Application No.: 60/527,990, filed Dec. 8, 2003.

FIELD

The present disclosure relates to a network of wireless communication systems, and more particularly to locating the position of a mobile wireless device in such a network.

BACKGROUND

The demand for locating the position of a mobile wireless device, such as a cellular phone, is on the rise. For instance, a mandate by the Federal Communications Commission (FCC) requires that the location of a caller dialing 911 on his/her cellular phone be identified with an accuracy of 400 feet when the 911 call is received. A widely known method for determining the position of a mobile wireless device uses the information obtained from the Global Positioning System (GPS).

The GPS is a satellite-based navigational system formed by a network of satellites broadcasting pseudo-random noise (PRN) codes modulated on a carrier band. The GPS satellites transmit signals from which mobile GPS receivers may estimate their locations. Each GPS satellite transmits signals using two carrier signals. The first carrier signal is modulated using two PRN codes, namely a coarse acquisition (C/A) code, and a precise (P) code. Each GPS satellite uses different PRN codes to distinguish it from the other satellites of the GPS.

To determine the location of a GPS receiver, acquisition and tracking of at least four satellite signals are required. GPS signal acquisition often involves computing the correlation between the received GPS signals and the C/A code of associated satellites at various phase offsets and Doppler-shifted frequencies. Following signal acquisition, a signal tracking process decodes the signals from the identified satellites at the phase offsets and Doppler-shifted frequencies. During the signal tracking phase, navigation data is received from the identified satellites. Embedded in the navigation data transmitted by the GPS satellites are data related to satellite positioning as well as clock timing (i.e., time stamp), commonly referred to as ephemeris data, from which the position of the GPS receiver is detected. Many techniques have been developed to acquire and track GPS signals and to read the ephemeris data so as to detect the location of the GPS receiver.

GPS-based position detection systems, however, have a number of disadvantages. One such disadvantage is that a GPS receiver must have a clear and unobstructed view of at least four GPS satellites in order to have its position detected accurately. Therefore, if a user of a GPS receiver is, for example, in a wooded or an urban area containing tall structures, the user may not have an obstructed view of the required number of satellites to be able to detect its position. The problem may further be compounded if the user is indoors.

To detect the position of a wireless receiver when fewer than four satellites are in clear view, algorithms have been developed that use the CDMA signals transmitted by the ground base stations. Communication between a wireless device and a base station is often established by a forward link via which signals are transmitted from the base station to the wireless device, and a reverse link via which the signals transmitted from the wireless device are received by the base station.

One known algorithm developed for detecting the position of a mobile wireless device using ground base stations is referred to as Advanced Forward Link Trilateration (AFLT). To detect the position of a mobile wireless device using AFLT, the location of the base stations disposed in the wireless network, the transmission times of the signals from the base stations as well as the arrival times of the signals at the mobile wireless device are required.

A mobile wireless device is often not in the line-of-sight of a base station with which it is in communication. Accordingly, the transmitted CDMA signals are often deflected by many objects and thus experience additional delays before they are received by the mobile wireless device. Conventional AFLT algorithms, however, assume that a mobile wireless device in communication with a base station is in the line-of-sight of that base station and thus detect a position that may include an unacceptable degree of inaccuracy.

Accordingly, there is a need for a technique that detects the position of a mobile wireless device using the CDMA signals transmitted by the base stations and which accounts for any additional delays that may have been caused by the deflections of these signals.

SUMMARY

In accordance with one embodiment of the present disclosure, to determine the position of a mobile wireless device (hereinafter alternatively referred to as the mobile device) that is within a coverage area of a base station, the time of arrival (TOA) of the signal received by the mobile device from the base station is reduced in proportion to the received power of the signal. The reduced TOA may subsequently be used together with the GPS signals to detect the position of the mobile device.

In some embodiments, the TOA is reduced by an amount, referred to as an excess delay, determined based on data gathered in the field. A number of techniques or algorithms may be used to determine the excess delay as a function of the received power using the gathered data. In some embodiments, the excess delay is defined by the following:

$$E = A \exp(-BP_{dBm})$$

where E represents the excess delay, $P_{dBm}$ represents a measure of the received power in dB, and A, B are constant parameters.

In some embodiments, the mobile device measures the TOA of GPS signal it receives from the satellites in its view, and measures the TOA and power of CDMA signals it receives from the base station(s). The mobile device determines any excess delay associated with the CDMA signal in order to compute a reduced TOA (alternatively referred to hereinbelow as biased TOA). Thereafter, the mobile device, using the TOAs of the GPS signals and the biased TOA of the CDMA signal, detects its position using any one of a number of known position determination algorithms.

In some embodiments, a position determination entity (PDE) detects the position of the mobile device. In these embodiments, the mobile device measures the TOA as well as power of the CDMA signal it receives from one or more base stations. Thereafter, the mobile device transmits the TOA and power measurements to the PDE. The PDE computes biased TOAs to estimate the position of the mobile device. Thereafter, the PDE transmits assistance data to the mobile device in order to enable the mobile device to view and receive GPS signals. Using this assistance data, the mobile device acquires and tracks the GPS satellites identified in the assistance data and measures the TOA of the signals it receives from these satellites. Next, the mobile device sends the measured TOA of the satellite signals to the PDE. In some embodiments, the PDE uses the TOA of GPS satellite signals, using any one of a number of known algorithms, to detect the position of the mobile device. In other embodiments, the PDE may use both the TOA of the GPS satellite signals as well as the biased TOAs of the base station signals to detect the position of the mobile device.

In some embodiments, the mobile device detects its position using assistance data it receives from the PDE. In these embodiments, the mobile device measures the TOA as well as power of the CDMA signal it receives from one or more base stations. Thereafter, the mobile device transmits the TOA and power measurements to the PDE. The PDE computes biased TOAs to estimate the position of the mobile device. Thereafter, the PDE transmits assistance data to the mobile device in order to enable the mobile device to view and receive GPS signals. Using this assistance data, the mobile device acquires and tracks the GPS satellites identified in the assistance data and measures the TOA of the signals it receives from these satellites. Thereafter, in some embodiments, the mobile device uses the TOA of the GPS satellite signals, using any one of a number of known algorithms, to detect its position. In yet other embodiments, the mobile device uses both the TOA of the GPS satellite signals as well as the biased TOA of the base station signals to detect its position.

DETAILED DESCRIPTION

In accordance with one embodiment of the present disclosure, to determine the position of a mobile wireless device (hereinafter alternatively referred to as the mobile device) that is within a coverage area of a base station, the time of arrival (TOA) of the signal received by the mobile device from the base station is reduced in proportion to the received power of the signal. The reduced TOA may subsequently be used together with the GPS signals to detect the position of the mobile device.

Figure 1:
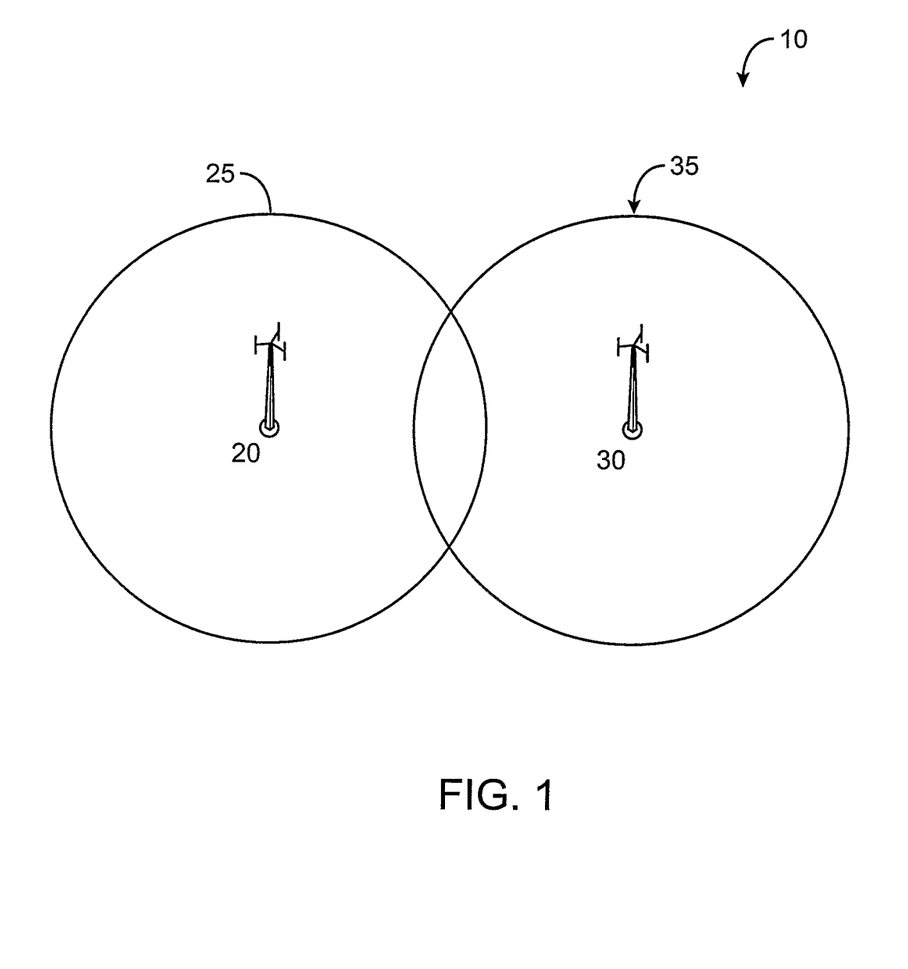
FIG. 1 is a simplified plan view of a pair of base stations disposed in a wireless network.

FIG. 1 is a simplified plan view of a section of an exemplary wireless network 10 that includes, in part, base stations 20 and 30 configured to communicate with a mobile wireless device (not shown). Base stations 20 and 30 have respective cells or coverage areas 25 and 35. Coverage area 25 is defined by the area of the circle that is centered on base station 20. Similarly, coverage area 35 is defined by the area of the circle that is centered on base station 30. It is understood that a base station refers to any transmitter/receiver whose location is known at the time of transmission. For example, a base station may include a cell tower of a wireless network or other wireless transmitters or infrastructures.

Figure 2:
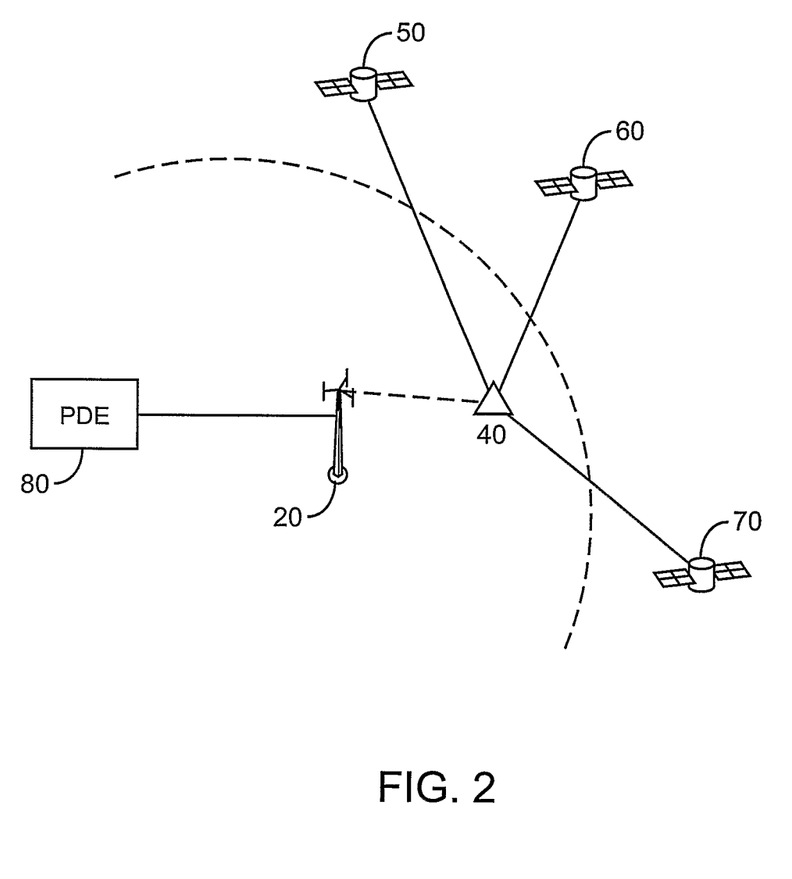
FIG. 2 is a simplified plan view of a mobile device in communication with a multitude of satellites and a base station.

FIG. 2 shows a mobile device 40 that, in this exemplary embodiment, is shown as having a clear and unobstructed view of three GPS satellites, 50, 60 and 70, and is also located within coverage area 25 of base station 20. Base station 20 is also shown as being adapted to communicate with a position determination entity 80. The position of mobile device 40 is detected using the CDMA signal that mobile device 40 is able to receive from base station 20 and the GPS signals it is able to receive from GPS satellites 50, 60 and 70. It is understood that the present disclosure applies when mobile device 40 is able to communicate with more than one base station and/or with fewer than three satellites.

As known to those skilled in the art, as the distance between mobile device 40 and base station 20 increases, it takes longer for a signal transmitted by base station 20 to reach mobile device 40. Moreover, because mobile device 40 is often not in the line-of-sight of base station 20, the signals transmitted by base station 20 are often deflected off of one or more objects (not shown in the drawings) before they reach mobile device 40. The farther the distance between mobile device 40 and base station 20, the higher is the likelihood of signal deflections. The deflections cause these signals to undergo additional delays before they are received by mobile device 40. Therefore, as the distance between mobile device 40 and base station 20 increases, the time of arrival (TOA) of the signal at mobile device 40 increases both because of the increased distance and because of the increased likelihood of signal deflection. Moreover, as the distance between mobile device 40 and base station 20 increases, the measure of the signal power received by mobile device 40 decreases both because of the increased distance and because of the increased likelihood of signal deflection.

To account for the extra delays (alternatively referred to hereinbelow as excess delay) caused by these deflections, in accordance with the present disclosure, the TOA of the signals at mobile device 40 is reduced by an amount defined by the power of the received signal. If, for example, the power of the received signal is relatively high, mobile device 40 is considered to be either in the line-of-sight or within a relatively short distance from base station 20. Accordingly, it is determined that small or insubstantial deflections have occurred and, consequently, either the TOA is left unchanged or is reduced by a small amount. If, for example, the power of the received signal is relatively low, mobile device 40 is considered not to be in the line-of-sight or not to be within a relatively short distance from base station 20. Accordingly, the TOA is reduced by a relatively larger amount.

Figure 3:
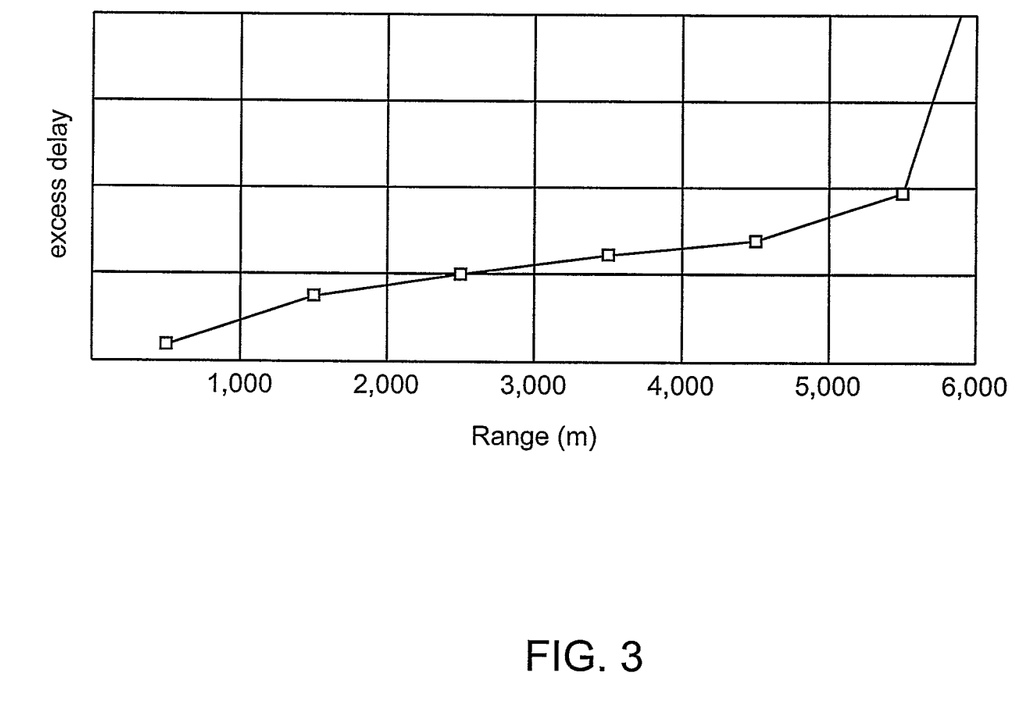
FIG. 3 is a graph of excess delay as a function of distance from a base station.

In some embodiments, the amount by which the TOA is reduced is determined based on data gathered in the field. FIG. 3 is a graph of excess delay as a function of distance from the base station (e.g., range) using data collected in the field. As is seen from FIG. 3, as the range increases, so does the excess delay. A number of techniques or algorithms may be used to determine the excess delay as a function of the received power. In some embodiments, the excess delay is determined to increases exponentially as the power decreases and in accordance with the following expression:

$$E = A \exp(-BP_{dBm})$$

where E represents the excess delay in meters, $P_{dBm}$ represents a measure of the received power in dB, and A, B are constant parameters. In some embodiments, A and B are respectively set to 0.2081 and 0.0628 respectively. Accordingly, in these embodiments, an excess delay of 1 meter is estimated for a received power of −25 dBm and an excess delay of 1,000 meters is estimated for a received power of −135 dBm. Using the excess delay as described above, any one of the following exemplary techniques may be used to detect the position of the mobile device.

Stand-Alone Position Detection

Figure 4:
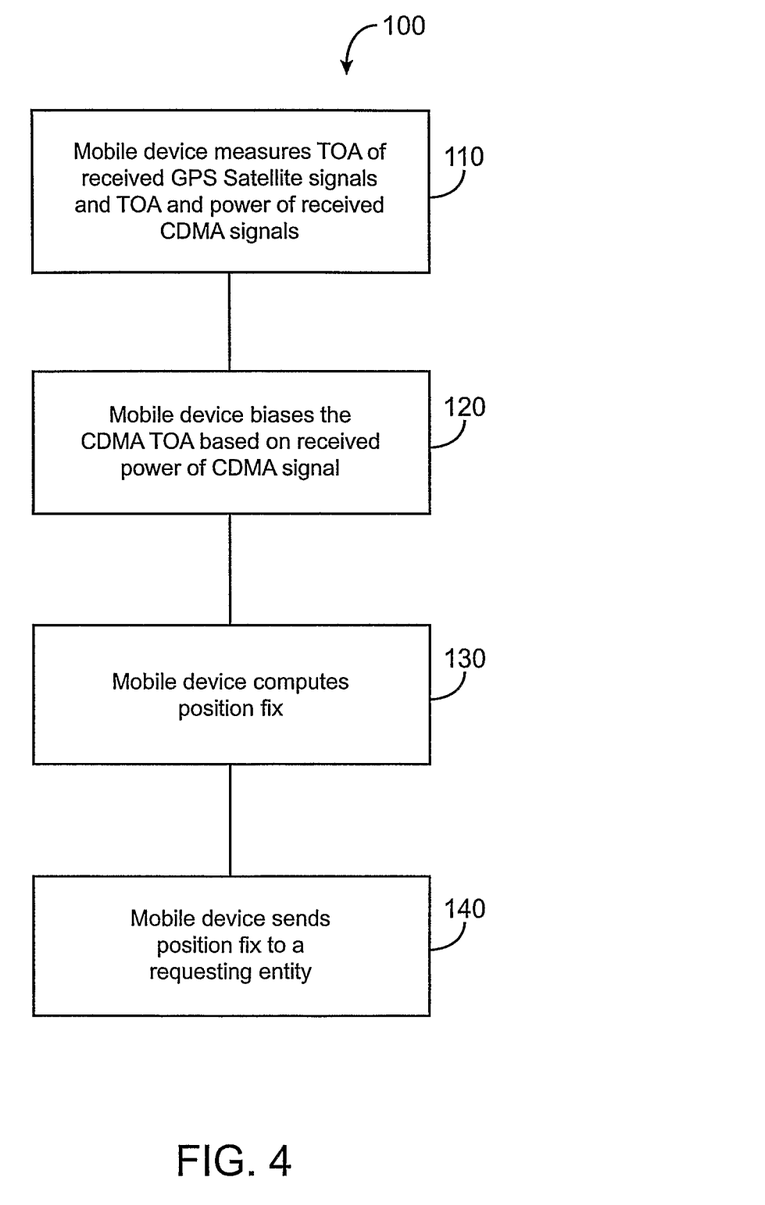
FIG. 4 is a flow-chart of steps carried out to detect the position of a wireless mobile device.

FIG. 4 is an exemplary flowchart 100 of steps carried out by a mobile device in detecting its position. Accordingly, in such embodiments, the position detection is performed by the mobile device. At step 110, the mobile device measures the TOA of GPS signals it receives from the satellites in its view, and measures the TOA and power of CDMA signal it receives from the base station. At step 120, the mobile device estimates any excess delay that the CDMA signal may have experienced during its flight from the base station to the mobile device. The technique used for estimating the excess delay is described above. The estimated excess delay is subsequently subtracted from the measured TOA of the CDMA signal at step 120 to generate a biased TOA. At step 130, the mobile device, using the measured TOAs of the GPS signals and the biased TOA of the CDMA signal, computes its position using any one of a number of known position determination algorithms. At step 140, the mobile device sends its detected position to an entity requesting it, such as a user or any other application that is in communication to the mobile device via a data link.

Figure 5:
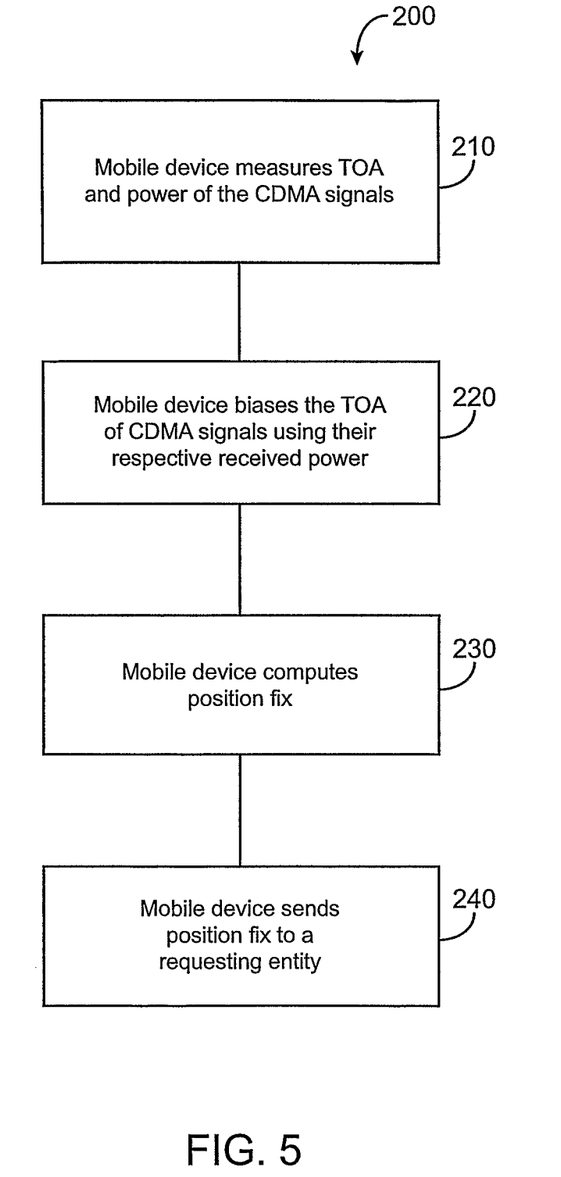
FIG. 5 is a flow-chart of steps carried out to detect the position of a wireless mobile device.

FIG. 5 is a flowchart 200 of steps carried out by a mobile device in detecting its position, in accordance with another embodiment. It is assumed that the mobile device does not have a view of any GPS satellites and is able to communicate with one or more base stations. The algorithms used to detect the position of the mobile device when it is able to communicate with only one or two base stations is described in copending PCT application No. PCT/US04/02750, entitled "Estimating a User Location with One or More Base Stations".

Referring to flowchart 200, at step 210, the mobile device measures the TOA as well as power of the CDMA signal it receives from the base station it is in communications with. At step 220, the mobile device computes any excess delay that the CDMA signal may have experienced as it traveled from the base station to the mobile device. The computed excess delay is subtracted from the measured TOA to generate an associated biased TOA. At step 230, the mobile device, using the biased TOA of the CDMA signal, computes its position. At step 240, the mobile device sends its detected position to an entity requesting it, such as a user or any other application that is in communication with the mobile device via a data link.

In the above embodiments, the mobile device includes a database that has information about the various parameters associated with each base station, such as the location of the base station within the wireless network, its coverage area, etc. Accordingly, in these embodiments, the mobile device determines its position using various codes of one or more software modules forming a program and executed as instructions/data by, e.g., a central processing unit, or using hardware modules specifically configured and dedicated to determine the position of the mobile wireless device. Alternatively, the determination of the position of the mobile device may be carried out using a combination of software and hardware modules.

Wireless-Assisted Position Detection

Figure 6:
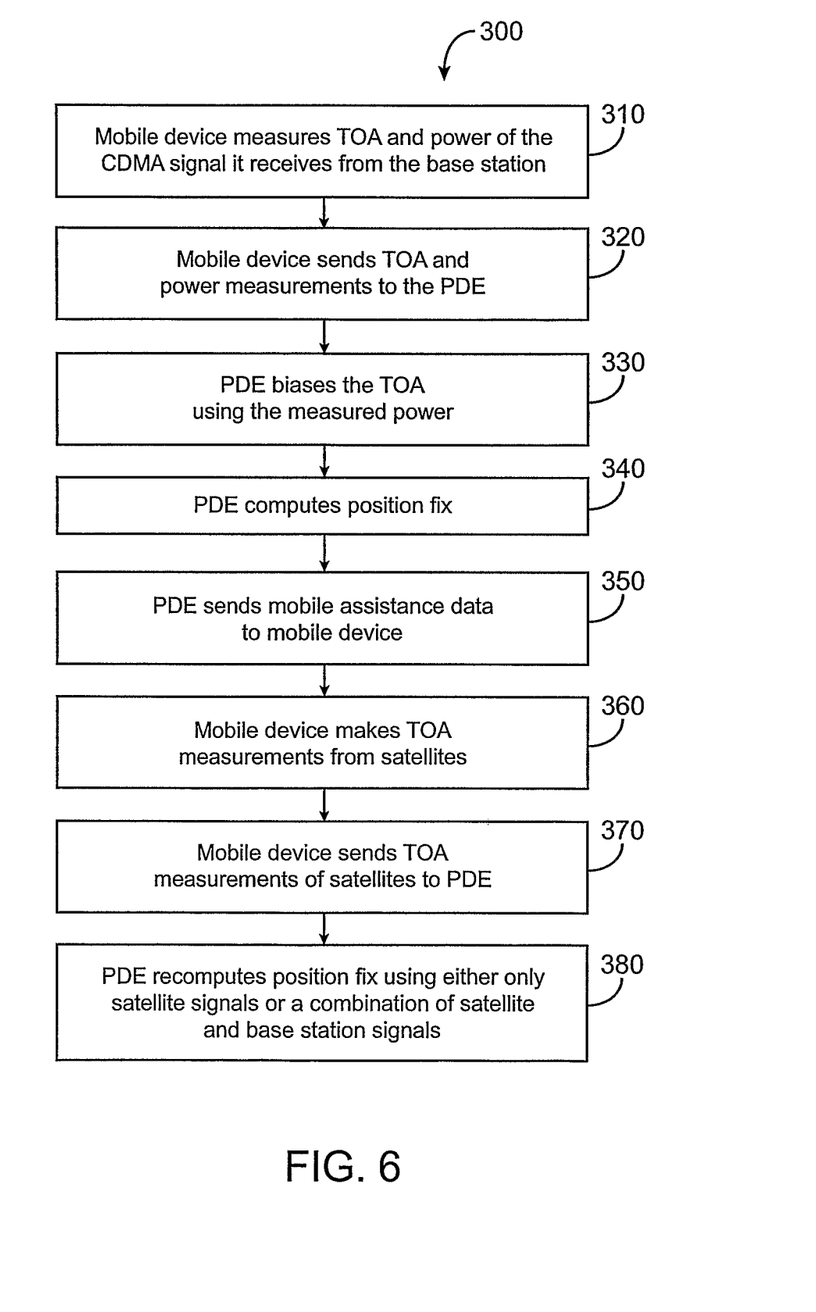
FIG. 6 is a flow-chart of steps carried out to detect the position of a wireless mobile device.

FIG. 6 is an exemplary flowchart 300 of steps carried out to detect the position of the mobile device. In such embodiments, the position detection is performed by a position determination entity (PDE), such as a server, and the PDE provides assistance data to the mobile device to acquire and track the GPS satellites. In these embodiments, the mobile device may not initially have a view of any GPS satellites. In the following, it is assumed that the mobile device is in communications with only one base station and thus receives CDMA signals from that base station only. It is understood, however, that the mobile device may be in communications with two or more base stations, the signals from all of which may be used in detecting the position of the mobile device.

At step 310, the mobile device measures the TOA as well as power of the CDMA signal it receives from the base stations. At step 320, the mobile device sends the measured TOA and power of the received CDMA signal to PDE. The PDE has a database that includes information about the various parameters associated with each base station, such as the location of the base station within the wireless network, its coverage area, etc. Accordingly, the PDE estimates any excess delay that the CDMA signal may have experienced as it traveled from the base station to the mobile device. The technique used for estimating the excess delay is described above. At step 330, the estimated excess delay is subtracted from the measured TOA to generate a biased TOA. At step 340, the PDE, using the biased TOA of the CDMA signal, estimates the position of the mobile device.

The PDE also has information about the position and timing of each of the GPS satellites. Accordingly, to find a more accurate position of the mobile device, at step 350, the PDE transmits assistance data to the mobile device. Such assistance data includes, for example, data regarding the time(s) during which the mobile device will have a view of the GPS satellites. Armed with this assistance data, the mobile device acquires and tracks the GPS satellites identified in the assistance data and measures the TOA of the signals it receives from them at step 360. At step 370, the mobile device sends the measured TOA of the satellite signals to the PDE. In some embodiments, at step 380, the PDE may only use the TOA of GPS satellite signals to recompute the position of the mobile device. In other embodiments, in step 380, the PDE may use both the TOA of the GPS satellite signals as well as the biased TOA of the base station signals, determined at step 330, to recompute the position of the mobile device. The PDE may use any number of known algorithms to recompute the position of the mobile device in step 380.

In the above embodiments, the PDE determines the position of the mobile device using various codes of one or more software modules forming a program and executed as instructions/data by, e.g., a central processing unit, or using hardware modules specifically configured and dedicated to determine the position of the mobile wireless device. Alternatively, the determination of the position of the mobile device may be carried out using a combination of software and hardware modules.

Stand-Alone Wireless-Assisted Position Detection

Figure 7:
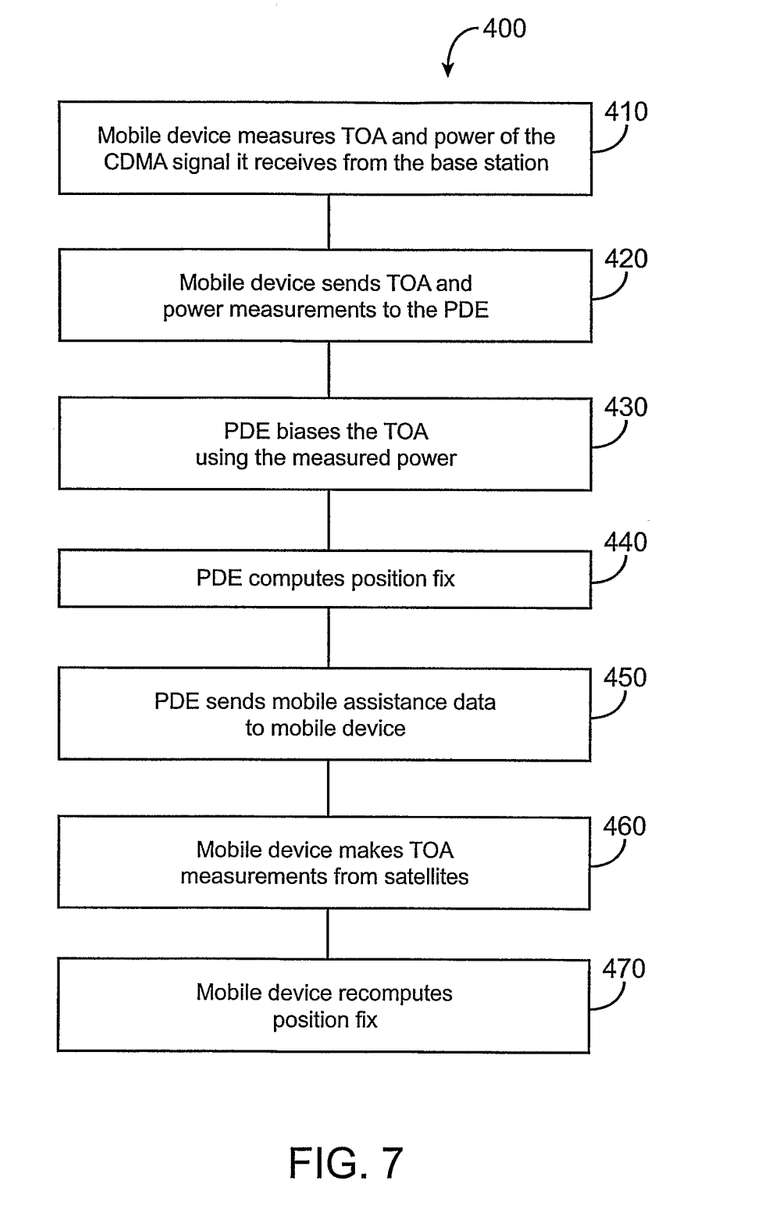
FIG. 7 is a flow-chart of steps carried out to detect the position of a wireless mobile device.

FIG. 7 is an exemplary flowchart 400 of steps carried out to detect the position of the mobile device. In such embodiments, the position detection is performed by the mobile device using assistance data from the PDE. In these embodiments, the mobile device may not initially have a view of any GPS satellites. In the following, it is assumed that the mobile device is in communications with only one base station and thus receives CDMA signals from that base station only. It is understood, however, that the mobile device may be in communications with two or more base stations, the signals from all of which may be used in detecting the position of the mobile device.

At step 410, the mobile device measures the TOA as well as power of the CDMA signal it receives from the base station. At step 420, the mobile device sends the measured TOA and power of the received CDMA signal to PDE. The PDE has a database that includes information about the various parameters associated with each base station, such as the location of the base station within the wireless network, its coverage area, etc. Accordingly, the PDE estimates any excess delay that the CDMA signal may have experienced as it traveled from the base station to the mobile device. The technique used for estimating the excess delay is described above. At step 430, the estimated excess delay is subtracted from the measured TOA to generate a biased TOA. At step 440, the PDE, using the biased TOA of the CDMA signal, estimates the position of the mobile device.

The PDE also has information about the position and timing of each of the GPS satellites. Accordingly, to find a more accurate position of the mobile device, at step 450, the PDE transmits assistance data to the mobile device. Such assistance data includes, for example, data regarding the time(s) during which the mobile device will have a view of the GPS satellites. Armed with this assistance data, the mobile device acquires and tracks the GPS satellites identified in the assistance data and measures the TOA of the signals it receives from them at step 460. In some embodiments, at step 470, the mobile device only uses the TOA of GPS satellite signals to recompute its position. In other embodiments, in step 470, the mobile device may use both the TOA of the GPS satellite signals as well as the biased TOA of the base station signals, determined in step 430, to recompute its position. The mobile device may use any number of known algorithms to recompute its position in step 470.

In the above embodiments, the mobile device detects it position using various codes of one or more software modules forming a program and executed as instructions/data by, e.g., a central processing unit, or using hardware modules specifically configured and dedicated to determine the position of the mobile wireless device. Alternatively, the determination of the position of the mobile device may be carried out using a combination of software and hardware modules.

The above embodiments of the present disclosure are illustrative and not limitative. The disclosure is not limited by the number of base stations disposed in a wireless network. The disclosure is not limited by the size of the coverage area of a base station or by the size of the overlap region between each pair of base stations. The disclosure is not limited by the number of base stations or satellites with which the mobile device is able to communicate. The disclosure is not limited by the expression, equation or algorithm, used to estimate the excess delay of a signal as function of the received power of that signal. The disclosure is not limited by the algorithm used to detect the position of a mobile device. Nor is the disclosure limited by the type of wireless network, base station or the mobile wireless device. Other additions, subtractions, deletions, and modifications may be made without departing from the scope of the present disclosure as set forth in the appended claims.

The invention claimed is:

1. A method comprising, with a mobile device:
receiving a signal from a base station in a wireless communication network;
measuring a time of arrival and a power of the received signal at the mobile device;
determining an excess delay value for the received signal based, at least in part, on an exponential relationship in which the excess delay value increases exponentially as the measured power decreases, the excess delay value representing an additional distance or an additional time that the received signal is estimated to have traveled from the base station to the mobile station with respect to a distance or a time corresponding to a direct line of sight path from the base station to the mobile station,
wherein the exponential relationship is indicative of a likelihood of signal deflection, which increases as a function of a distance traveled from the base station;
generating a biased time of arrival for the received signal based, at least in part, on the measured time of arrival and the excess delay value; and
estimating a position of the mobile device based, at least in part, on the biased time of arrival.

2. The method of claim 1, wherein the exponential relationship is determined, at least in part, by:

$$E = A \exp(-BP_{dBm})$$

where E represents the time delay, $P_{dBm}$ represents the received power in dB, and A, B are constants.

3. The method of claim 1, wherein the excess delay value is based, at least in part, on previously gathered data.

4. The method of claim 1, and further comprising transmitting the estimated position to the base station.

5. The method of claim 1, and further comprising:
estimating the position of the mobile device based further, at least in part, on at least one signal received from at least one GPS satellite.

6. A mobile device comprising:
a processing unit or hardware module to:
receive a signal from a base station in a wireless communication network;
measure a time of arrival and a power of the signal;
determine an excess delay value for the received signal based, at least in part, on an exponential relationship in which the excess delay value increases exponentially as the measured power decreases, the excess delay value representing an additional distance or an additional time that the received signal is estimated to have traveled from the base station to the mobile station with respect to a distance or a time corresponding to a direct line of sight path from the base station to the mobile station, wherein the exponential relationship is indicative of a likelihood of signal deflection, which increases as a function of a distance traveled from the base station;
generate a biased time of arrival the received signal based, at least in part, on the measured time of arrival and the excess delay value; and
estimate a position of the mobile device based, at least in part, on the biased time of arrival.

7. The mobile device of claim 6, wherein the exponential relationship is determined, at least in part, by:

$$E = A \exp(-BP_{dBm})$$

where E represents the time delay, $P_{dBm}$ represents the received power in dB, and A, B are constants.

8. The mobile device of claim 6, wherein the excess delay value is based, at least in part, on previously gathered data.

9. The mobile device of claim 6, the processing unit or hardware module to further initiate transmission of the estimated position to the base station.

10. An apparatus comprising:
a processing unit or hardware module to:
  receive, from a mobile station, a time of arrival and a power for a received signal as measured at the mobile station, the received signal having been previously transmitted-from a base station of a wireless communication network and received by the mobile station;
  determine an excess delay value for the received signal based, at least in part, on an exponential relationship in which the excess delay value increases exponentially as the measured power decreases, the excess delay value representing an additional distance or an additional time that the received signal is estimated to have traveled from the base station to the mobile station with respect to a distance or a time corresponding to a direct line of sight path from the base station to the mobile station,
  wherein the exponential relationship is indicative of a likelihood of signal deflection, which increases as a function of a distance traveled from the base station;
  generate a biased time of arrival the received signal based, at least in part, on the measured time of arrival and the excess delay value; and
  estimate a position of the mobile device based, at least in part, on the biased time of arrival.

11. The apparatus of claim 10, wherein the exponential relationship is determined, at least in part, by:

$$E = A \exp(-BP_{dBm})$$

where E represents the time delay, $P_{dBm}$ represents the received power in dB, and A, B are constants.

12. The apparatus of claim 10, wherein the excess delay value is based, at least in part, on previously gathered data.

13. The apparatus of claim 10, the processing unit or hardware module to further estimate the position of the mobile device based, at least in part, on at least one signal transmitted by at least one GPS satellite.

14. The apparatus of claim 10, wherein the apparatus comprises a position determination entity.

15. A mobile device comprising:
  means for receiving a signal from a base station in a wireless communication network;
  means for measuring a time of arrival and a power of the signal;
  means for determining an excess delay value for the received signal based, at least in part, on an exponential relationship in which the excess delay value increases exponentially as the measured power decreases, the excess delay value representing an additional distance or an additional time that the received signal is estimated to have traveled from the base station to the mobile station with respect to a distance or a time corresponding to a direct line of sight path from the base station to the mobile station, wherein the exponential relationship is indicative of a likelihood of signal deflection, which increases as a function of a distance traveled from the base station;
  means for generating a biased time of arrival for the received signal based, at least in part, on the measured time of arrival and the excess delay value; and
  means for estimating a position of the mobile device based, at least in part, on the biased time of arrival.

16. The mobile device of claim 15, wherein the exponential relationship is determined, at least in part, by:

$$E = A \exp(-BP_{dBm})$$

where E represents the excess delay value, $P_{dBm}$ represents the received power in dB, and A, B are constants.

17. The mobile device of claim 15, wherein the excess delay value is based, at least in part, on previously gathered data.

18. The mobile device of claim 15, and further comprising means for transmitting the estimated position to the base station.

19. An apparatus comprising:
  means for receiving, from a mobile station, a time of arrival and a power for a received signal as measured at the mobile station, the received signal having been previously transmitted from a base station of a wireless communication network and received by the mobile station;
  means for determining an excess delay value for the received signal based, at least in part, on an exponential relationship in which the excess delay value increases exponentially as the measured power decreases, the excess delay value representing an additional distance or an additional time that the received signal is estimated to have traveled from the base station to the mobile station with respect to a distance or a time corresponding to a direct line of sight path from the base station to the mobile station, wherein the exponential relationship is indicative of a likelihood of signal deflection, which increases as a function of a distance traveled from the base station;
  means for generating a biased time of arrival the received signal based, at least in part, on the measured time of arrival and the excess delay value; and
  means for estimating a position of the mobile device based, at least in part, on the biased time of arrival.

20. The apparatus of claim 19, wherein the exponential relationship is determined, at least in part, by:

$$E = A \exp(-BP_{dBm})$$

where E represents the time delay, $Pd_{dBm}$ represents the received power in dB, and A, B are constants.

21. The apparatus of claim 19, wherein the excess delay value is based, at least in part, on previously gathered data.

22. The apparatus of claim 19 further comprising means for further estimating the position of the mobile device based, at least in part, on at least one signal transmitted by at least one GPS satellite.

* * * * *